(12) United States Patent
Weber

(10) Patent No.: US 10,781,135 B2
(45) Date of Patent: Sep. 22, 2020

(54) STRENGTHENING VARIABLE THICKNESS GLASS

(75) Inventor: Douglas J. Weber, Arcadia, CA (US)

(73) Assignee: APPLE INC., Cupertino, CA (US)

( * ) Notice: Subject to any disclaimer, the term of this patent is extended or adjusted under 35 U.S.C. 154(b) by 184 days.

(21) Appl. No.: 13/235,036

(22) Filed: Sep. 16, 2011

(65) Prior Publication Data

US 2012/0236526 A1 Sep. 20, 2012

Related U.S. Application Data

(60) Provisional application No. 61/453,398, filed on Mar. 16, 2011.

(51) Int. Cl.
C03C 21/00 (2006.01)
(52) U.S. Cl.
CPC .................. C03C 21/002 (2013.01)
(58) Field of Classification Search
CPC .................................................. C03C 21/002
USPC ............ 65/30.1, 30.13, 30.14, 111, 114–116
See application file for complete search history.

(56) References Cited

U.S. PATENT DOCUMENTS

| | | |
|---|---|---|
| 2,643,020 A | 6/1953 | Dalton |
| 3,415,637 A | 12/1968 | Glynn |
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,626,723 A | 12/1971 | Plumat |
| 3,652,244 A * | 3/1972 | Plumat .................. 65/30.14 |

(Continued)

FOREIGN PATENT DOCUMENTS

| | | |
|---|---|---|
| AT | 283 630 B | 10/1970 |
| CN | 1369449 A | 9/2002 |

(Continued)

OTHER PUBLICATIONS

Chemically Strengthened Glass, Wikipedia, Apr. 19, 2009, http://en/wikipedia.org/w/index.php?title=Chemically_strengthened_glass&oldid=284794988.

(Continued)

*Primary Examiner* — Michael H. Wilson
*Assistant Examiner* — Yana B Krinker
(74) *Attorney, Agent, or Firm* — Brownstein Hyatt Farber Schreck, LLP

(57) ABSTRACT

Apparatus, systems and methods for increasing the strength of glass are disclosed. The use of multi-bath chemical processing for a glass article can facilitate controlled chemical strengthening. Through multi-bath (or multi-step) chemical processing, differing levels of strengthening can be achieved for different portion of glass articles. The multi-bath chemical processing can be achieved through the use of successive chemical baths. Accordingly, glass articles that have undergone multi-bath chemical processing are able to be not only thin but also sufficiently strong and resistant to damage. The strengthened glass articles are well suited for use in consumer products, such as consumer electronic devices (e.g., portable electronic devices). In one embodiment, the glass member can pertain to a glass cover for a housing of an electronic device.

20 Claims, 10 Drawing Sheets

(56) References Cited

U.S. PATENT DOCUMENTS

| | | | | |
|---|---|---|---|---|
| 3,753,840 | A | 8/1973 | Plumat | |
| 3,798,013 | A * | 3/1974 | Inoue et al. | 65/30.14 |
| 3,843,472 | A | 10/1974 | Toussaint et al. | |
| 3,857,689 | A * | 12/1974 | Koizumi et al. | 65/30.13 |
| 3,926,605 | A | 12/1975 | Kunkle | |
| 3,951,707 | A | 4/1976 | Kurtz et al. | |
| 4,015,045 | A * | 3/1977 | Rinehart | 428/410 |
| 4,052,184 | A | 10/1977 | Anderson | |
| 4,119,760 | A * | 10/1978 | Rinehart | 428/410 |
| 4,156,755 | A * | 5/1979 | Rinehart | 428/410 |
| 4,165,228 | A | 8/1979 | Ebata et al. | |
| 4,148,082 | A | 12/1979 | Ganswein et al. | |
| 4,212,919 | A * | 7/1980 | Hoda | 428/410 |
| 4,218,230 | A | 8/1980 | Hogan | |
| 4,346,601 | A | 8/1982 | France | |
| 4,353,649 | A | 10/1982 | Kishii | |
| 4,425,810 | A | 1/1984 | Simon et al. | |
| 4,537,820 | A | 8/1985 | Nowobliski et al. | |
| 4,646,722 | A | 3/1987 | Silverstein et al. | |
| 4,733,973 | A | 3/1988 | Machak et al. | |
| 4,842,629 | A * | 6/1989 | Clemens et al. | 65/30.13 |
| 4,844,724 | A * | 7/1989 | Sakai et al. | 65/30.13 |
| 4,846,868 | A | 7/1989 | Aratani | |
| 4,849,002 | A | 7/1989 | Rapp | |
| 4,872,896 | A | 10/1989 | LaCourse et al. | |
| 4,911,743 | A | 3/1990 | Bagby | |
| 4,937,129 | A * | 6/1990 | Yamazaki | 428/195.1 |
| 4,957,364 | A | 9/1990 | Chesler | |
| 4,959,548 | A | 9/1990 | Kupperman et al. | |
| 4,983,197 | A * | 1/1991 | Froning et al. | 65/386 |
| 4,986,130 | A | 1/1991 | Engelhaupt et al. | |
| 5,041,173 | A | 8/1991 | Shikata et al. | |
| 5,104,435 | A * | 4/1992 | Oikawa et al. | 65/30.13 |
| 5,129,934 | A | 7/1992 | Koss | |
| 5,157,746 | A * | 10/1992 | Tobita et al. | 385/33 |
| 5,160,523 | A * | 11/1992 | Honkanen et al. | 65/400 |
| 5,254,149 | A | 10/1993 | Hashemi et al. | |
| 5,269,888 | A * | 12/1993 | Morasca | 205/769 |
| 5,281,303 | A * | 1/1994 | Beguin et al. | 216/62 |
| 5,369,267 | A | 11/1994 | Johnson et al. | |
| 5,411,563 | A | 5/1995 | Yeh | |
| 5,437,193 | A | 8/1995 | Schleitweiler et al. | |
| 5,445,871 | A | 8/1995 | Murase et al. | |
| 5,483,261 | A | 1/1996 | Yasutake | |
| 5,488,204 | A | 1/1996 | Mead et al. | |
| 5,525,138 | A | 6/1996 | Hashemi et al. | |
| 5,625,154 | A | 4/1997 | Matsuhiro et al. | |
| 5,654,057 | A | 8/1997 | Kitayama | |
| 5,725,625 | A | 3/1998 | Kitayama et al. | |
| 5,733,622 | A | 3/1998 | Starcke et al. | |
| 5,766,493 | A | 6/1998 | Shin | |
| 5,780,371 | A | 7/1998 | Rifqi et al. | |
| 5,816,225 | A | 10/1998 | Koch et al. | |
| 5,825,352 | A | 10/1998 | Bisset et al. | |
| 5,826,601 | A | 10/1998 | Muraoka et al. | |
| 5,835,079 | A | 11/1998 | Shieh | |
| 5,880,411 | A | 3/1999 | Gillespie et al. | |
| 5,930,047 | A | 7/1999 | Gunz et al. | |
| 5,953,094 | A | 9/1999 | Matsuoka et al. | |
| 5,985,014 | A | 11/1999 | Ueda et al. | |
| 6,050,870 | A | 4/2000 | Suginoya et al. | |
| 6,114,039 | A | 9/2000 | Rifqui | |
| 6,120,908 | A | 9/2000 | Papanu et al. | |
| 6,166,915 | A | 12/2000 | Lake et al. | |
| 6,188,391 | B1 | 2/2001 | Seely et al. | |
| 6,245,313 | B1 | 6/2001 | Suzuki et al. | |
| 6,287,674 | B1 | 9/2001 | Verlinden et al. | |
| 6,307,590 | B1 | 10/2001 | Yoshida | |
| 6,310,610 | B1 | 10/2001 | Beaton et al. | |
| 6,323,846 | B1 | 11/2001 | Westerman et al. | |
| 6,325,704 | B1 | 12/2001 | Brown et al. | |
| 6,327,011 | B2 | 12/2001 | Kim | |
| 6,350,664 | B1 | 2/2002 | Haji et al. | |
| 6,393,180 | B1 * | 5/2002 | Farries et al. | 385/37 |
| 6,429,840 | B1 | 8/2002 | Sekiguchi | |
| 6,516,634 | B1 * | 2/2003 | Green et al. | 65/30.14 |
| 6,521,862 | B1 | 2/2003 | Brannon | |
| 6,621,542 | B1 | 9/2003 | Aruga | |
| 6,690,387 | B2 | 2/2004 | Zimmerman et al. | |
| 6,718,612 | B2 | 4/2004 | Bajorek | |
| 6,769,274 | B2 * | 8/2004 | Cho et al. | 65/386 |
| 6,772,610 | B1 | 8/2004 | Albrand et al. | |
| 6,810,688 | B1 | 11/2004 | Duisit et al. | |
| 6,936,741 | B2 | 8/2005 | Munnig et al. | |
| 6,955,971 | B2 | 10/2005 | Ghyselen et al. | |
| 6,996,324 | B2 * | 2/2006 | Hiraka et al. | 385/141 |
| 7,012,700 | B2 | 3/2006 | De Groot et al. | |
| 7,013,709 | B2 | 3/2006 | Hajduk et al. | |
| 7,015,894 | B2 | 3/2006 | Morohoshi | |
| 7,070,837 | B2 | 7/2006 | Ross | |
| 7,166,531 | B1 | 1/2007 | Van Den Hoek et al. | |
| 7,184,064 | B2 | 2/2007 | Zimmerman et al. | |
| 7,461,564 | B2 | 12/2008 | Glaesemann | |
| 7,558,054 | B1 | 7/2009 | Prest et al. | |
| 7,626,807 | B2 | 12/2009 | Hsu | |
| 7,663,607 | B2 | 2/2010 | Hotelling et al. | |
| 7,810,355 | B2 | 10/2010 | Feinstein et al. | |
| 7,872,644 | B2 | 1/2011 | Hong et al. | |
| 7,918,019 | B2 | 4/2011 | Chang et al. | |
| 8,013,834 | B2 | 9/2011 | Kim | |
| 8,110,268 | B2 | 2/2012 | Hegemier et al. | |
| 8,111,248 | B2 | 2/2012 | Lee et al. | |
| 8,312,743 | B2 * | 11/2012 | Pun et al. | 65/386 |
| 8,391,010 | B2 | 3/2013 | Rothkopf | |
| 8,393,175 | B2 | 3/2013 | Kohli et al. | |
| 8,551,283 | B2 | 10/2013 | Pakula et al. | |
| 8,673,163 | B2 | 3/2014 | Zhong | |
| 8,684,613 | B2 | 4/2014 | Weber et al. | |
| 8,824,140 | B2 | 9/2014 | Prest | |
| 9,128,666 | B2 | 9/2015 | Werner | |
| 2002/0035853 | A1 | 3/2002 | Brown et al. | |
| 2002/0105793 | A1 | 8/2002 | Oda | |
| 2002/0155302 | A1 | 10/2002 | Smith et al. | |
| 2002/0157199 | A1 | 10/2002 | Piltingsrud | |
| 2003/0024274 | A1 * | 2/2003 | Cho et al. | 65/386 |
| 2003/0057183 | A1 | 3/2003 | Cho et al. | |
| 2003/0077453 | A1 | 7/2003 | Oaku et al. | |
| 2003/0234771 | A1 | 12/2003 | Mulligan et al. | |
| 2004/0051944 | A1 | 3/2004 | Stark | |
| 2004/0119701 | A1 | 6/2004 | Mulligan et al. | |
| 2004/0137828 | A1 | 7/2004 | Takashashi et al. | |
| 2004/0142118 | A1 | 7/2004 | Takechi | |
| 2004/0163414 | A1 * | 8/2004 | Eto et al. | 65/30.14 |
| 2005/0058423 | A1 | 3/2005 | Brinkmann et al. | |
| 2005/0105071 | A1 | 5/2005 | Ishii | |
| 2005/0135724 | A1 | 6/2005 | Helvajian et al. | |
| 2005/0174525 | A1 | 8/2005 | Tsuboi | |
| 2005/0193772 | A1 | 9/2005 | Davidson et al. | |
| 2005/0245165 | A1 | 11/2005 | Harada et al. | |
| 2005/0259438 | A1 | 11/2005 | Mizutani | |
| 2005/0285991 | A1 | 12/2005 | Yamazaki | |
| 2006/0026521 | A1 | 2/2006 | Hotelling et al. | |
| 2006/0055936 | A1 | 3/2006 | Yun et al. | |
| 2006/0063351 | A1 | 3/2006 | Jain | |
| 2006/0070694 | A1 | 4/2006 | Rehfeld et al. | |
| 2006/0097991 | A1 | 5/2006 | Hotelling et al. | |
| 2006/0197753 | A1 | 9/2006 | Hotelling et al. | |
| 2006/0227331 | A1 | 10/2006 | Wollmer et al. | |
| 2006/0238695 | A1 | 10/2006 | Miyamoto | |
| 2006/0250559 | A1 | 11/2006 | Bocko et al. | |
| 2006/0268528 | A1 | 11/2006 | Zadesky et al. | |
| 2006/0292822 | A1 | 12/2006 | Xie | |
| 2006/0294420 | A1 | 12/2006 | Schneider | |
| 2007/0003796 | A1 | 1/2007 | Isono et al. | |
| 2007/0013822 | A1 | 1/2007 | Kawata et al. | |
| 2007/0029519 | A1 | 2/2007 | Kikuyama et al. | |
| 2007/0030436 | A1 | 2/2007 | Sasabayashi | |
| 2007/0039353 | A1 | 2/2007 | Kamiya | |
| 2007/0046200 | A1 | 3/2007 | Fu et al. | |
| 2007/0063876 | A1 | 3/2007 | Wong | |
| 2007/0089827 | A1 | 4/2007 | Funatsu | |
| 2007/0122542 | A1 | 5/2007 | Halsey et al. | |
| 2007/0132737 | A1 | 6/2007 | Mulligan et al. | |
| 2007/0196578 | A1 | 8/2007 | Karp et al. | |

(56) References Cited

U.S. PATENT DOCUMENTS

| | | |
|---|---|---|
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1* | 4/2008 | Ushiro et al. ............... 359/620 |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1* | 11/2008 | Ellison et al. ............... 428/220 |
| 2009/0011803 A1* | 1/2009 | Weber et al. ............... 455/575.1 |
| 2009/0046240 A1* | 2/2009 | Bolton ........................ 349/158 |
| 2009/0067141 A1 | 3/2009 | Dabov et al. |
| 2009/0090694 A1* | 4/2009 | Hotelling ............... G06F 3/044 216/41 |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1* | 1/2010 | Allan et al. .................. 428/220 |
| 2010/0024484 A1 | 2/2010 | Kashima |
| 2010/0028607 A1* | 2/2010 | Lee et al. .................... 428/156 |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1* | 7/2010 | Sellier et al. .................. 501/32 |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2010/0315909 A1* | 12/2010 | Altenhoven et al. .. G04B 39/00 368/295 |
| 2010/0321305 A1 | 12/2010 | Chang et al. |
| 2011/0003619 A1 | 1/2011 | Bolton |
| 2011/0012873 A1 | 1/2011 | Prest et al. |
| 2011/0019123 A1* | 1/2011 | Prest ........................ C03C 19/00 349/58 |
| 2011/0019354 A1 | 1/2011 | Prest et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1* | 8/2011 | Sellier et al. ............... 359/652 |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0027399 A1* | 2/2012 | Yeates ........................ 396/535 |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1* | 5/2012 | Glaesemann et al. ......... 428/156 |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1* | 8/2012 | Barefoot et al. ............. 428/220 |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1672468 | 9/2005 |
| CN | 1693247 | 11/2005 |
| CN | 1694589 A | 11/2005 |
| CN | 101025502 | 8/2007 |
| CN | 101206314 | 6/2008 |
| CN | 101939266 | 1/2011 |
| CN | 102117104 | 7/2011 |
| CN | 102131357 | 7/2011 |
| CN | 101267509 | 8/2011 |
| CN | 102591576 | 7/2012 |
| CN | 202799425 U | 3/2013 |
| CN | 103958423 | 7/2014 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| GB | 1 346 747 | 2/1974 |
| JP | B S42-011599 | 6/1963 |
| JP | B-S48-006925 | 3/1973 |
| JP | 52031757 | 3/1977 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | A S61-097147 | 5/1986 |
| JP | 63 060129 | 3/1988 |
| JP | AS63106617 | 5/1988 |
| JP | 05249422 | 9/1993 |
| JP | 6242260 A | 9/1994 |
| JP | A H07-050144 | 2/1995 |
| JP | Hei 8-274054 | 10/1996 |
| JP | 52031757 | 3/1997 |
| JP | A-H09-073072 | 3/1997 |
| JP | A H09-507206 | 7/1997 |
| JP | 09-312245 | 12/1997 |
| JP | A H11-281501 | 10/1999 |
| JP | A 2000-086261 | 3/2000 |
| JP | 2000-163031 | 6/2000 |
| JP | 2002/03895 | 7/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | A 2002-338283 | 11/2002 |
| JP | A2003502257 | 1/2003 |

(56) References Cited

FOREIGN PATENT DOCUMENTS

| | | |
|---|---|---|
| JP | A 2004-094256 | 3/2004 |
| JP | A2004-339019 | 12/2004 |
| JP | 2005162549 | 6/2005 |
| JP | A 2005-156766 | 6/2005 |
| JP | A 2005140901 | 6/2005 |
| JP | 2005353592 | 12/2005 |
| JP | A 2000-348338 | 12/2005 |
| JP | 2007-099557 | 4/2007 |
| JP | 2008007360 | 1/2008 |
| JP | 2008-63166 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | A 2009-167086 | 7/2009 |
| JP | A 2009-234856 | 10/2009 |
| JP | A2009230341 | 10/2009 |
| JP | 2010 064943 | 3/2010 |
| JP | A 2010-060908 | 3/2010 |
| JP | A 2010-116276 | 5/2010 |
| JP | U3162733 | 8/2010 |
| JP | 2010/195600 | 9/2010 |
| JP | A 2010-237493 | 10/2010 |
| JP | A 2011-032140 | 2/2011 |
| JP | A 2011-158799 | 8/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/143999 A1 | 11/2008 |
| WO | WO 2009/003029 | 12/2008 |
| WO | WO 2009/078406 | 6/2009 |
| WO | WO 2009/102326 | 8/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO2010/027565 | 2/2011 |
| WO | WO 2011/041484 A1 | 4/2011 |
| WO | WO 2012/015960 | 2/2012 |
| WO | WO 2012/027220 A2 | 3/2012 |
| WO | WO 2012/106280 | 8/2012 |
| WO | WO 2013/106242 A2 | 7/2013 |

OTHER PUBLICATIONS

Wikipedia: "Iphone 4", www.wikipedia.org, retrived Oct. 31, 2011, 15 pgs.

"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.

Arun K. Varshneya, Chemical Strengthening of Glass: Lessons Learned and Yet to be Learned International Journal of Applied Glass Science, 2010, 1, 2, pp. 131-142.

Aben "Laboratory of Photoelasticity", Institute of Cybernetics at TTU, www.ioc.ee/res/photo.html, Oct. 5, 2000.

Forooghian et al., Investigative Ophthalmology & Visual Science; Oct. 2008, vol. 49, No. 10.

International Search Report and Written Opinion for PCT/US2012/029279, dated Jul. 25, 2012.

Office Action for Taiwanese Patent Application No. 101109011, dated Nov. 14, 2013.

Final Office Action for Japanese Patent Application No. 2013-558184, dated Jul. 3, 2015.

Second Notice of Preliminary Rejection for Korean Patent Application No. 10-2013-7024531, dated Aug. 26, 2015.

Kingery et al., "Introduction to Ceramics" 2nd Ed. John Wiley & Sons, 1976, pp. 792 and 833-844.

Office Action for Chinese Patent Application No. 201280013356.8, dated Dec. 31, 2015.

Ohkuma, "Development of a Manufacturing Process of a Thin, Lightweight LCD Cell", Department of Cell Process Development, IBM, Japan, Section 13.4.

Lee et al., "A Multi-Touch Three Dimensional Touch-Sensitive Tablet", Proceedings of CHI: ACM Conference on Human Factors in Computing Systems, Apr. 1985, pp. 21-25.

Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.

Rubine, "Combining Gestures and Direct Manipulation", CHI '92, May 1992, pp. 659-660.

Westerman, "Hand Tracking, Finger Identification and Chrodic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.

International Preliminary Report of Patentability for International Appliation No. PCT/US2012/029279, dated Sep. 17, 2013.

Karlsson et al., "The Technology of Chemical Glass Strengthening-a review", Apr. 2010, Glass Technology, European Journal of Glass Science and Technology A., vol. 51, No. 2, pp., 41-54.

Office Action for Japanese Patent Application No. 2013-558184, dated Aug. 25, 2014.

Notice of Preliminary Rejection for Korean Patent Application No. 10-2013-7024531, dated Dec. 10, 2014.

First Office Action for Chinese Patent Application No. 201280013356.8, dated Apr. 16, 2015.

Mehrl et al., "Designer's Noticebook: Proximity Detection IR LED and Optical Crosstalk," http://ams.com/eng/content/view/download/145137, Aug. 1, 2011, 5 pages.

Wikipedia: "Iphone 4," www.wikipedia.org, retrieved Oct. 31, 2011, 15 pages.

* cited by examiner

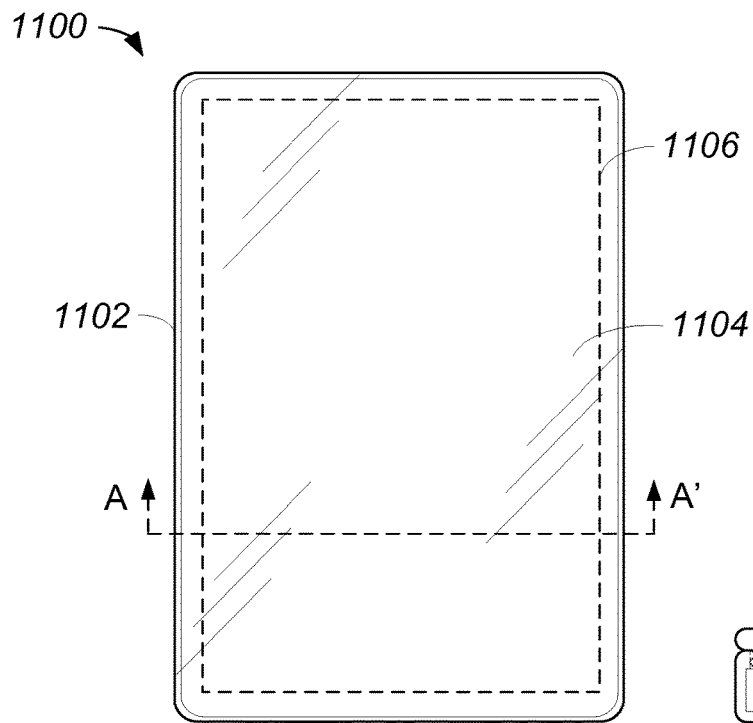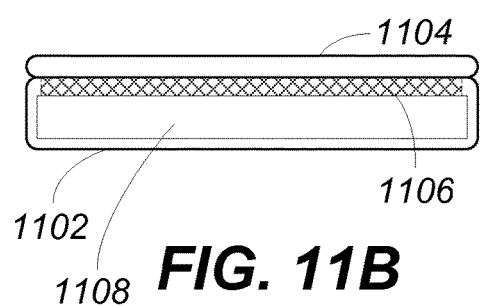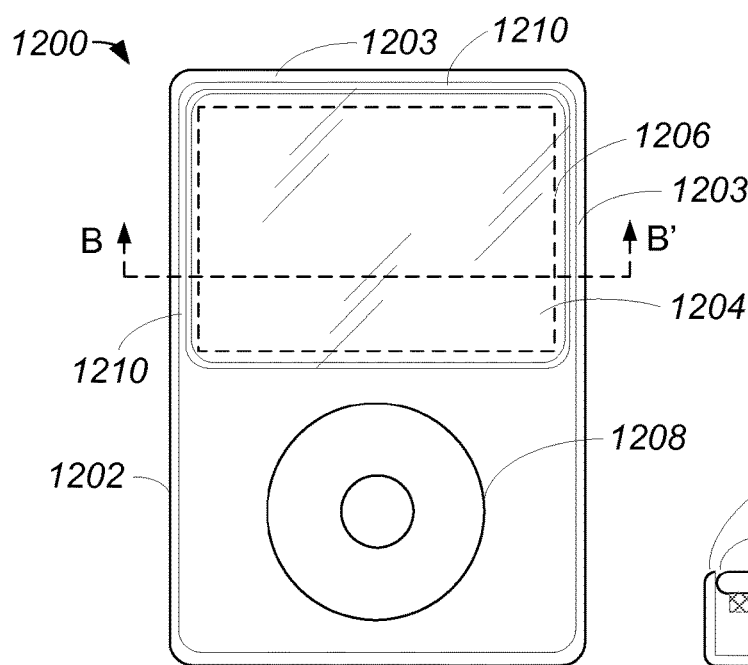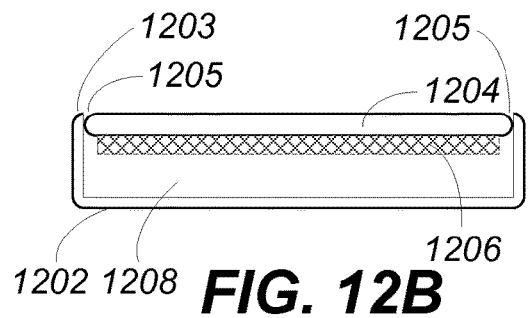
FIG. 11A
FIG. 11B
FIG. 12A
FIG. 12B

STRENGTHENING VARIABLE THICKNESS GLASS

CROSS-REFERENCE TO RELATED APPLICATION

This application claims priority benefit of U.S. Provisional Application No. 61/453,398, filed Mar. 16, 2011, and entitled "STRENGTHENING VARIABLE THICKNESS GLASS," which is hereby incorporated herein by reference.

BACKGROUND OF THE INVENTION

Conventionally, some portable electronic devices use glass as a part of their devices, either internal or external. Externally, a glass part can be provided as part of a housing, such a glass part is often referred to as a cover glass. The transparent and scratch-resistance characteristics of glass make it well suited for such applications. Internally, glass parts can be provided to support display technology. More particularly, for supporting a display, a portable electronic device can provide a display technology layer beneath an outer cover glass. A sensing arrangement can also be provided with or adjacent the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass.

Unfortunately, however, use of glass with portable electronic devices requires that the glass be relatively thin. Generally speaking, the thinner the glass the more susceptible the glass is to damage when the portable electronic device is stressed or placed under a significant force. Chemically strengthening has been used to strengthen glass. While chemically strengthening is effective, there is a continuing need to provide improved ways to strengthen glass, namely, thin glass.

SUMMARY

The invention relates generally to increasing the strength of glass. The use of multi-bath chemical processing for a glass article can facilitate controlled chemical strengthening. Through multi-bath (or multi-step) chemical processing, differing levels of strengthening can be achieved for different portion of glass articles. The multi-bath chemical processing can be achieved through the use of successive chemical baths. Accordingly, glass articles that have undergone multi-bath chemical processing are able to be not only thin but also sufficiently strong and resistant to damage. The strengthened glass articles are well suited for use in consumer products, such as consumer electronic devices (e.g., portable electronic devices).

The invention can be implemented in numerous ways, including as a method, system, device, or apparatus. Several embodiments of the invention are discussed below.

As a method for chemically strengthening a piece of glass, one embodiment can, for example, include at least: providing a piece of glass, the piece of glass having a first portion and a second portion, the first portion having a first thickness, the second portion having a second thickness, the second thickness being different than the first thickness; chemically strengthening the first portion to a first level; and chemically strengthening the second portion to a second level, the second level being different than the first level.

As a method for strengthening a piece of glass, the piece of glass having a first region with a first thickness and a second region with a second thickness, one embodiment can, for example, include at least: applying a first mask to the second region of the piece of glass; chemically strengthening the first region; subsequently removing the first mask from the second region; applying a second mask to the first region; chemically strengthening the second region; and subsequently removing the second mask from the first region.

As a method for strengthening a piece of glass, the piece of glass having a thinner region and a thicker region, another embodiment can, for example, include at least: applying a first mask to the thinner region of the piece of glass; chemically strengthening the thicker region; subsequently removing the first mask from the thinner region; and chemically strengthening both the thinner region and the thicker region.

As a method for processing a glass piece to improve its strength, one embodiment can, for example, include at least: masking a first portion of the glass piece to block ion exchange; submerging the glass piece in a heated ion bath to facilitate ion exchange with at least a portion of the glass piece other than the first portion which is masked; removing the glass piece from the heated ion bath after a first predetermined duration; unmasking the first portion of the glass piece after removing the glass piece from the heated ion bath; subsequently submerging the glass piece in the heated ion bath or another heated ion bath to facilitate ion exchange with at least the first portion of the glass piece; and removing the glass piece from the heated ion bath or the another heated ion bath after a second predetermined duration.

As a consumer electronic product, one embodiment can, for example, include at least a housing having a front surface, a back surface and side surfaces. At least partially internal to the housing, are electrical components. The electrical components can include at least a controller, a memory, and a display. The display can be provided at or adjacent the front surface of the housing. A cover glass can be provided at or over the front surface of the housing such that it is provided over the display. The cover glass can have a varied thickness at a plurality of different portions, and the plurality of different portions can be strengthened chemically strengthening differently.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 11A and 11B are diagrammatic representations of electronic device according to one embodiment.

FIGS. 12A and 12B are diagrammatic representations of electronic device according to another embodiment.

DETAILED DESCRIPTION OF EMBODIMENTS OF THE INVENTION

Figure 1:
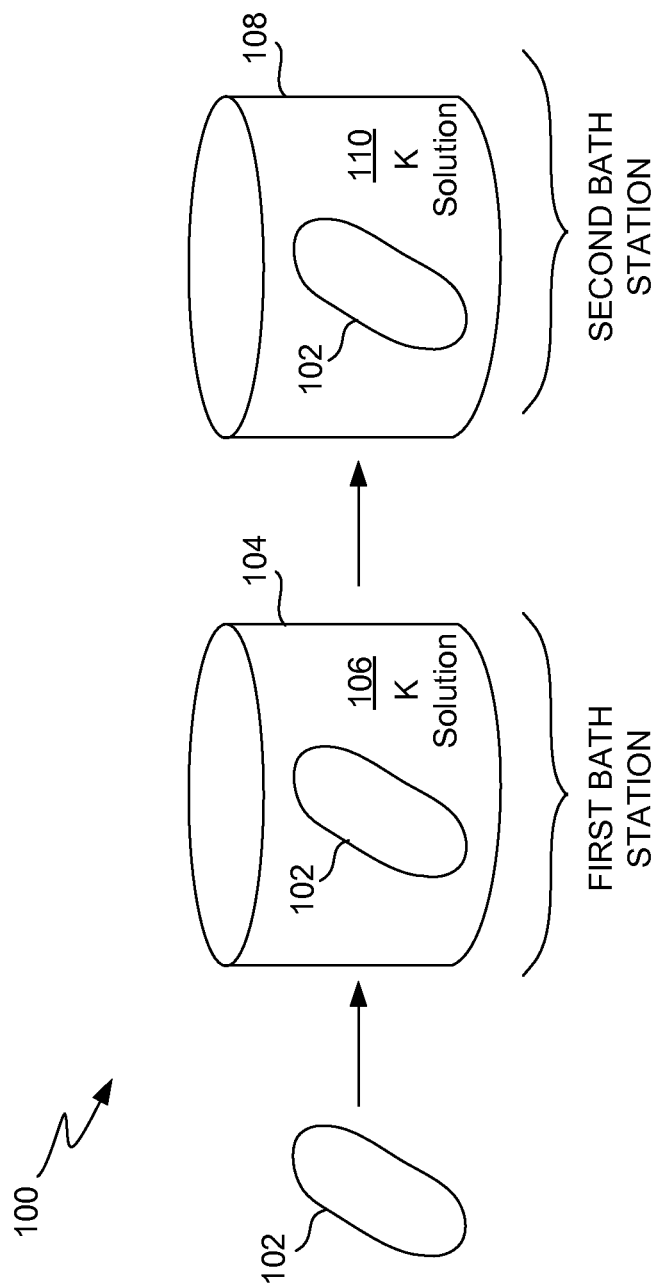
FIG. 1 illustrates a glass strengthening system according to one embodiment.

The invention relates generally to increasing the strength of glass. The use of multi-bath chemical processing for a glass article can facilitate controlled chemical strengthening. Through multi-bath (or multi-step) chemical processing, differing levels of strengthening can be achieved for different portion of glass articles. The multi-bath chemical processing can be achieved through the use of successive chemical baths. Accordingly, glass articles that have undergone multi-bath chemical processing are able to be not only thin but also sufficiently strong and resistant to damage. The strengthened glass articles are well suited for use in consumer products, such as consumer electronic devices (e.g., portable electronic devices).

Embodiments of the invention can relate to apparatus, systems and methods for improving strength of a thin glass member for a consumer product, such as a consumer electronic device. In one embodiment, the glass member may be an outer surface of a consumer electronic device. For example, the glass member may, for example, correspond to a glass cover that helps form part of a display area of the electronic device (i.e., situated in front of a display either as a separate part or integrated within the display). As another example, the glass member may form a part of a housing for the consumer electronic device (e.g., may form an outer surface other than in the display area). In another embodiment, the glass member may be an inner component of a consumer electronic device. For example, the glass member can be a component glass piece of a LCD display provided internal to the housing of the consumer electronic device.

The apparatus, systems and methods for improving strength of thin glass are especially suitable for glass covers or displays (e.g., LCD displays), particularly those assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.3 and 2.5 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.3 and 3 mm.

Embodiments of the invention are discussed below with reference to FIGS. 1-12B. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

FIG. 1 illustrates a glass strengthening system 100 according to one embodiment. The glass strengthening system 100 receives a glass article 102 to be strengthened through chemical processing. The glass article 102 is provided to a first bath station in which a first bath 104 is provided. The glass article 102 can be inserted (e.g., immersed) into the first bath 104 which includes a potassium solution 106. Next, the glass article 102 is removed from the first bath station and provided to a second bath station. The second bath station provides a second bath 108. The glass article can be inserted (e.g., immersed) into the second bath 108 which includes a potassium solution 110. Later, the glass article 102 is removed from the second bath 108. At this point, the glass article has been first enhanced and then strengthened. Through use of the multiple stages of chemical strengthening as well as masking portions of the glass article 102, the chemical strengthening can be controllably induced into the glass article 102.

Furthermore, following removal of the glass article from the second bath 108, post-processing can be performed on the glass article 102. Post-processing can vary widely dependent on intended application for the glass article. However, post-processing can, for example, include one or more of rinsing, polishing, annealing and the like.

The potassium solution 106 within the first bath 104 can be heated to a predetermined temperature, and the glass article 102 can be immersed within the first bath 104 for a predetermined period of time (duration). The degree of chemical strengthening of the glass article 102 is dependent on: (1) type of glass, (2) concentration of bath (e.g., K concentration), (3) time in the first bath 104, and (4) temperature of the first bath 104. Likewise, the potassium solution 110 within the second bath 108 can heated to a predetermined temperature, and the glass article 102 can be immersed within the second bath 108 for a predetermined period of time. The degree of chemically strengthening provided by the second bath 108 to the glass article is similarly dependent on: (1) type of glass, (2) concentration of bath (e.g., K concentration), (3) time in the second bath 108, and (4) temperature of the second bath 108.

In one implementation, the glass for the glass article 102 can, for example, be alumina silicate glass, soda lime glass or Lithium-based glass. Also, glass from different suppliers, even if the same type of glass, can have different properties and thus may require different values. In one embodiment the first bath 104 and the second bath 108 can be potassium nitrate (KNO3) baths. The time for the glass article 102 to remain immersed in the first bath 104 can, for example, be about 2-20 hours and the temperature for the first bath 104 can be about 350-450 degrees Celsius. The time for the glass article 102 to remain immersed in the second bath 108 can, for example, be about 2-20 hours and the temperature for the second bath 108 can be about 350-450 degrees Celsius. Also, an electronic field can be induced to assist with the chemical strengthening process, which would lower the duration of time the glass article 103 is to be immersed in an ion exchange bath and/or facilitate enhanced chemical strengthening.

Figure 2:
FIG. 2 illustrates a glass article according to one embodiment.

FIG. 2 illustrates a glass article 200 according to one embodiment. The glass article 200 has a uniform thickness (t). Typically, the thickness for the glass article 200 depends on its usage. As an example, if the glass article 200 is destined for use as part of a portable electronic device, the thickness tends to be rather thin, such as on the order of 0.5 to 5.0 mm. The glass article 200 has an outer surface 202. When the glass article 200 is chemically strengthened, such as by placing the glass article 200 in a heated ion bath, ion exchange with other ions present at the outer surface 202 of the glass article. Accordingly, during the chemical strengthening, the ion exchange can be controlled to occur to a determined depth of layer (DoL). The result is an outer strengthened region 204 of the glass article 200. The amount of chemical strengthening and the depth of the depth of layer (DoL) depends on various criteria including thickness of the glass article 200, intended usage of the glass article 200, type of glass, concentration of the ion bath, temperature of the ion bath, and others. As an example, the depth of layer could range from 10-200 μm.

Figure 3:
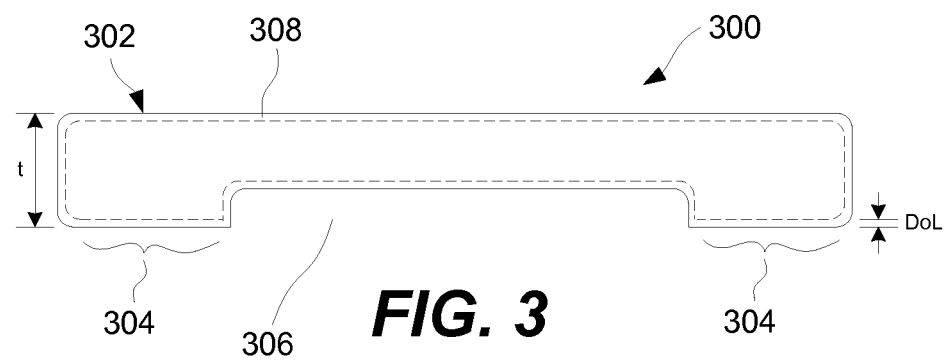
FIG. 3 illustrates a glass article according to another embodiment.

FIG. 3 illustrates a glass article 300 according to another embodiment. The glass article 300 has an outer surface 302 and a variable thickness. Unlike FIG. 2, the glass article 300 has a variable thickness. In particular, the glass article 300 can include side regions 304 and a middle region 306. In the example illustrated in FIG. 3, the middle region 306 has a thickness that is substantially different from a thickness (t) of the side regions 304. For example, the thickness of the middle region 306 can be 20-70% of the thickness (t) of the side regions 304. Typically, the thickness (t) for the glass article 300 depends on its usage. As an example, if the glass article 300 is destined for use as part of a portable electronic device, the thickness tends to be rather thin, such as on the order of 0.3 to 2.0 mm.

Nevertheless, if the glass article 300 is chemically strengthened by placing the glass article 300 in a heated ion bath, ion exchange with other ions at the surface 302 of the glass article can occur. The ion exchange occurs to pay determined depth of layer (DL L). Hence, similar to FIG. 2, the chemical strengthening serves to strengthen an outer peripheral region 308 of the glass article 300. In this embodiment, the depth of layer (DoL) is generally uniform across the outer periphery of the glass article 300. However, since the middle region 306 has a smaller thickness than do the side regions 304, the depth of layer can be restricted so that the middle region 306 (which is the thinner region) is not placed under too much central tension. Consequently, with respect to the glass article 300, if chemical strengthening is performed in a uniform fashion such as illustrated in FIG. 3, the depth of layer for such chemical strengthening may be unduly limited or not optimized.

Figure 4:
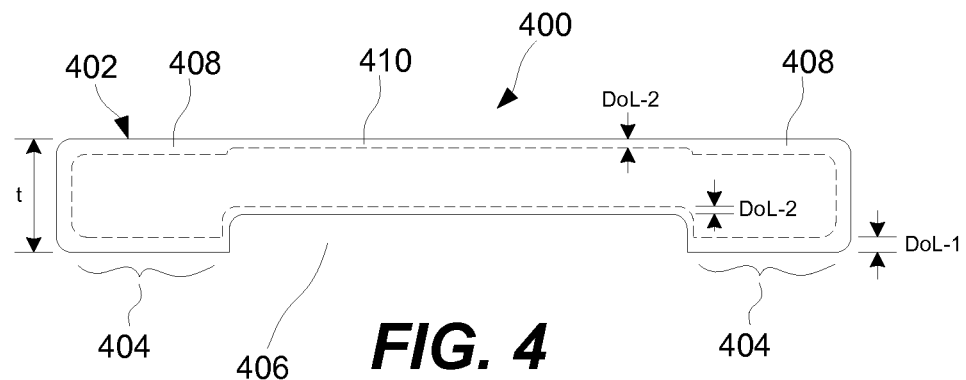
FIG. 4 is a cross-sectional diagram of a glass article according to still another embodiment.

FIG. 4 is a cross-sectional diagram of a glass article 400 according to still another embodiment. The glass article 400 illustrated in FIG. 4 has an outer surface 402. The glass article 400 has a variable thickness in which side regions 404 are thicker than an inner region 406. In the example illustrated in FIG. 4, the middle region 406 has a thickness that is substantially different from a thickness (t) of the side regions 404. For example, the thickness of the middle region 406 can be 20-70% of the thickness (t) of the side regions 404. Typically, the thickness (t) for the glass article 400 depends on its usage. As an example, if the glass article 400 is destined for use as part of a portable electronic device, the thickness tends to be rather thin, such as on the order of 0.5 to 5.0 mm.

Through chemical strengthening, the glass article 400 can be rendered stronger. Given that the glass article 400 has a variable thickness, the chemical strengthening provided to the different regions can be separately controlled. For example, the chemical strengthening for the different regions can be optimized for it features, characteristics or usage.

In the embodiment illustrated in FIG. 4, the side regions 404 which are thicker than the middle region 406 can be chemically strengthened to a greater extent than the middle region 406. Specifically, as depicted in FIG. 4, the side regions 404 show that a chemical strengthened region 408 is provided to a first depth of layer (DoL-1), and the middle region 406 shows that a chemical strengthened region 410 has a second depth of layer (DoL-2). As clearly depicted in FIG. 4, the first depth of layer (DoL-1) is greater than the second depth of layer (DoL-2). Since the side regions 404 are thicker regions of the glass article 400, greater amounts of chemical strengthening can be safely provided to the side regions 404. For the middle portion 406, chemical strengthening can be performed, but due to its relative thinness, the amount, level or degree of chemical strengthening can be less than that of the side regions 404.

In one embodiment, the ability to separately control the amount of chemical strengthening provided to different regions of glass article, allows chemical strengthening to be optimized on a per region basis. Consequently, a glass article having variable thickness can be chemically strengthened in a manner that optimizes chemical strengthening for each of the distinct regions.

Figure 5:
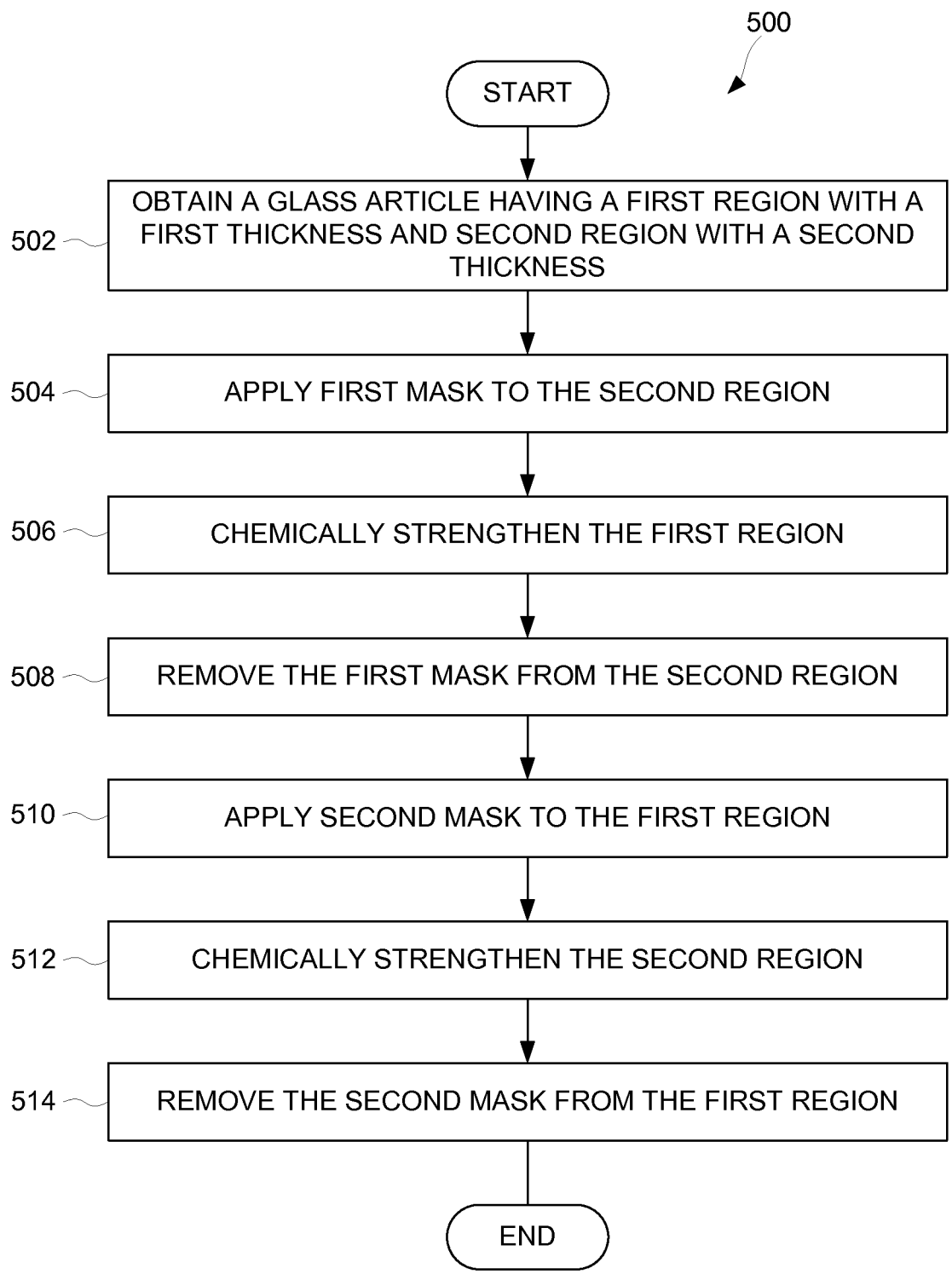
FIG. 5 is a flow diagram of a glass strengthening process according to one embodiment.

FIG. 5 is a flow diagram of a glass strengthening process 500 according to one embodiment. The glass strengthening process 500 is particularly well-suited for strengthening a glass article that has regions of different thickness. For example, the glass strengthening process 500 can yield the glass article 400 shown in FIG. 4 which has different degree, amount or level of chemically strengthening applied to different regions.

The glass strengthening process 500 can initially obtain 502 a glass article that is to be strengthened. The glass article can be configured to have a first region with a first thickness and a second region with a second thickness. In other words, the glass article can be considered to have variable thickness.

After the glass article is obtained 502, a first mask can be applied 504 to the second region of the glass article. The glass article can then be chemically strengthened 506. More particularly, the first region of the glass article can be chemically strengthened 506, while the second region is not chemically strengthened. The first mask can serves to inhibit chemical strengthening from being performed with respect to the second region. After the chemical strengthening 506 has concluded, the first mask can be removed 508 from the second region. Then, a second mask can be applied 510 to the first region of the glass article. The second mask can serve to inhibit chemical strengthening from being performed with respect to the first region.

After the second mask has been applied 510, the glass article can again be chemically strengthened 512. At this point, the second region of the glass article is being chemically strengthened 512, while the second mask serves to prevent additional chemical strengthening to the first region of the class article. After the chemical strengthening 512 has concluded, the second mask can be removed 514 from the first region. Following the removal 514 of the second mask from the first region, the glass strengthening process 500 can end.

Additionally, although not shown, additional post-processing can be performed with respect to the glass member. Still further, the glass article can eventually be used in a consumer electronic device, such as a handheld electronic device where the glass article can form, for example, a portion of said outer housing.

Although the first mask and the second mask can be formed such that chemically strengthening is completely blocked by the mask material, it should be understood that the mask material might only reduce chemical strengthening. The masking material can vary, including a metal layer (e.g., foil), polyimide, and the like. Photolithographic patterning or etching can be used to pattern the mask material. The metal layer can, for example, be aluminum.

Figure 6A:
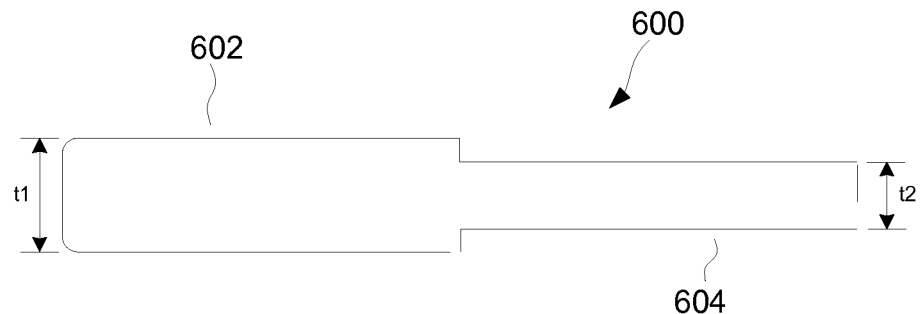
FIGS. 6A-6F illustrate processing to chemically strengthened a glass article.
Figure 6B:
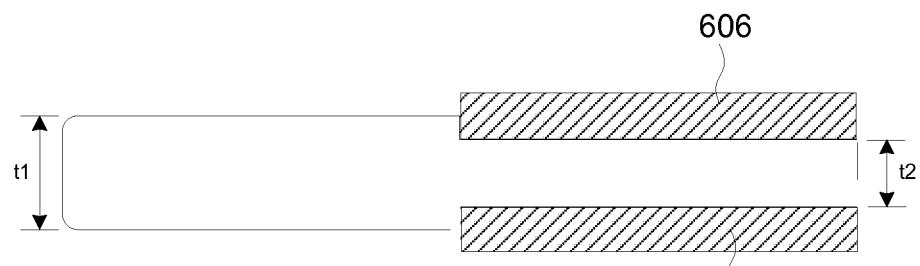
Figure 6C:
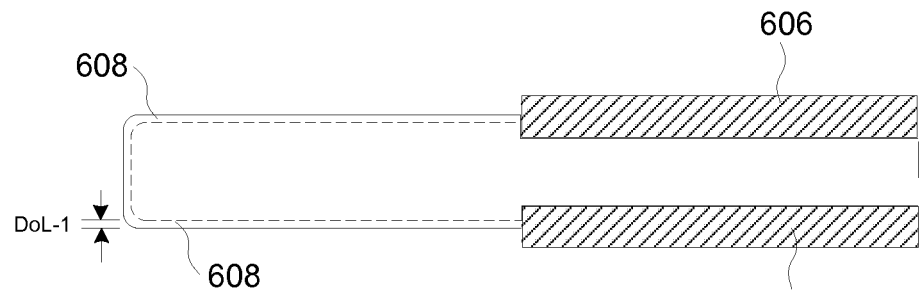
Figure 6D:
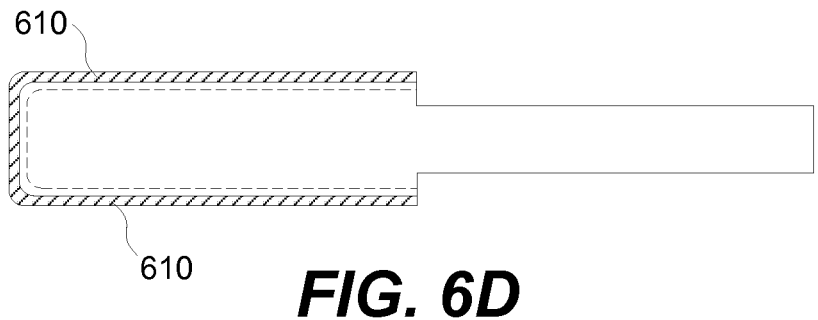
Figure 6E:
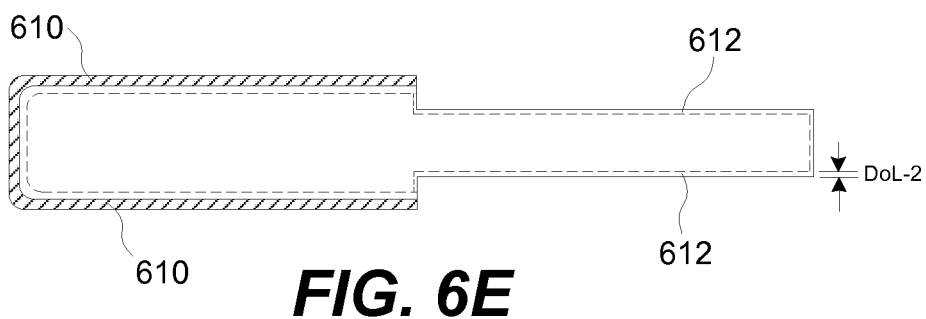
Figure 6F:
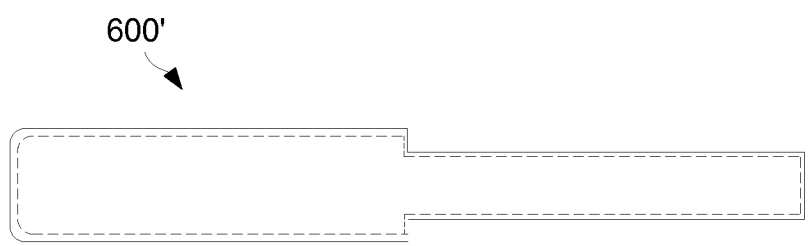

FIGS. 6A-6F illustrate processing to chemically strengthened a glass article 600. The processing can correspond to the glass strengthening process 500 illustrated in FIG. 5. In FIG. 6A, the glass article 600 is shown having a variable thickness. The glass article 600 has a thick region 602 with a thickness t1, and a thin region 604 having a thickness t2. In FIG. 6B, a mask 606 can then be applied over the thin region 604 of the glass article 600. Then, as illustrated in FIG. 6C, upon placing the glass article 600 with the applied mask 606 into a chemical strengthening bath, a peripheral region 608 of the thick region 602 can be chemically strengthened. The chemical strengthening at the peripheral region 608 has a controlled first depth of layer. Following the chemical strengthening that results in the peripheral region 608 of the thick region 602, the glass article 600 can be removed from the chemical strengthening bath and the mask 606 can be removed. In FIG. 6D, a second mask 610 can be applied to the thick region 602 of the glass article 600. Then, as illustrated in FIG. 6E, upon placing the glass article 600 with the applied second mask 610 into a chemical strengthening bath (which can be the same as the above-described chemical strengthening bath or a new chemical strengthening bath) so that a peripheral region 612 of the thin region 604 can be chemically strengthened. The chemical strengthening of the peripheral region 612 has a second depth of layer. In this example, the second depth of layer is less than the first depth of layer. Following the chemical strengthening that results in the peripheral region 612 of the thin region 604, the glass article 600 can be removed from the chemical strengthening bath and the mask 610 can be removed. Consequently, as shown in FIG. 6F, the resulting glass article 600' represents a strengthened version of the glass article 600 in which the thick region 602 is chemically strengthened to a greater extent than the thin region 604. Advantageously, the different regions of the glass article 600 are able to be chemically strengthened differently for better performance.

Following such chemical strengthening, depending on the type of glass, the glass article 600' having a 1 mm thickness can have a central tension (CT) of about 20-100 MPa (Mega Pascals) at a central portion, the peripheral portion 612 can have a peak compressive stress at the surface 602 of about 300-1100 MPa, and the depth of the compressive layer (i.e., depth of layer) can be about 20-150 microns. As examples, the glass article 600' can be formed of aluminosilicate glass or lithium-aluminosilicate glass. In a more specific embodiment, the glass article 600' having a 1 mm thickness can have a central tension (CT) of about 50-60 MPa (Mega Pascals) at a central portion, the peripheral portion 612 can have a peak compressive stress at the surface 602 of about 700-800 MPa, and the depth of the compressive layer (i.e., depth of layer) can be about 50-60 microns for the thick region 602 and about 30-40 microns for the thin region 604.

Figure 7:
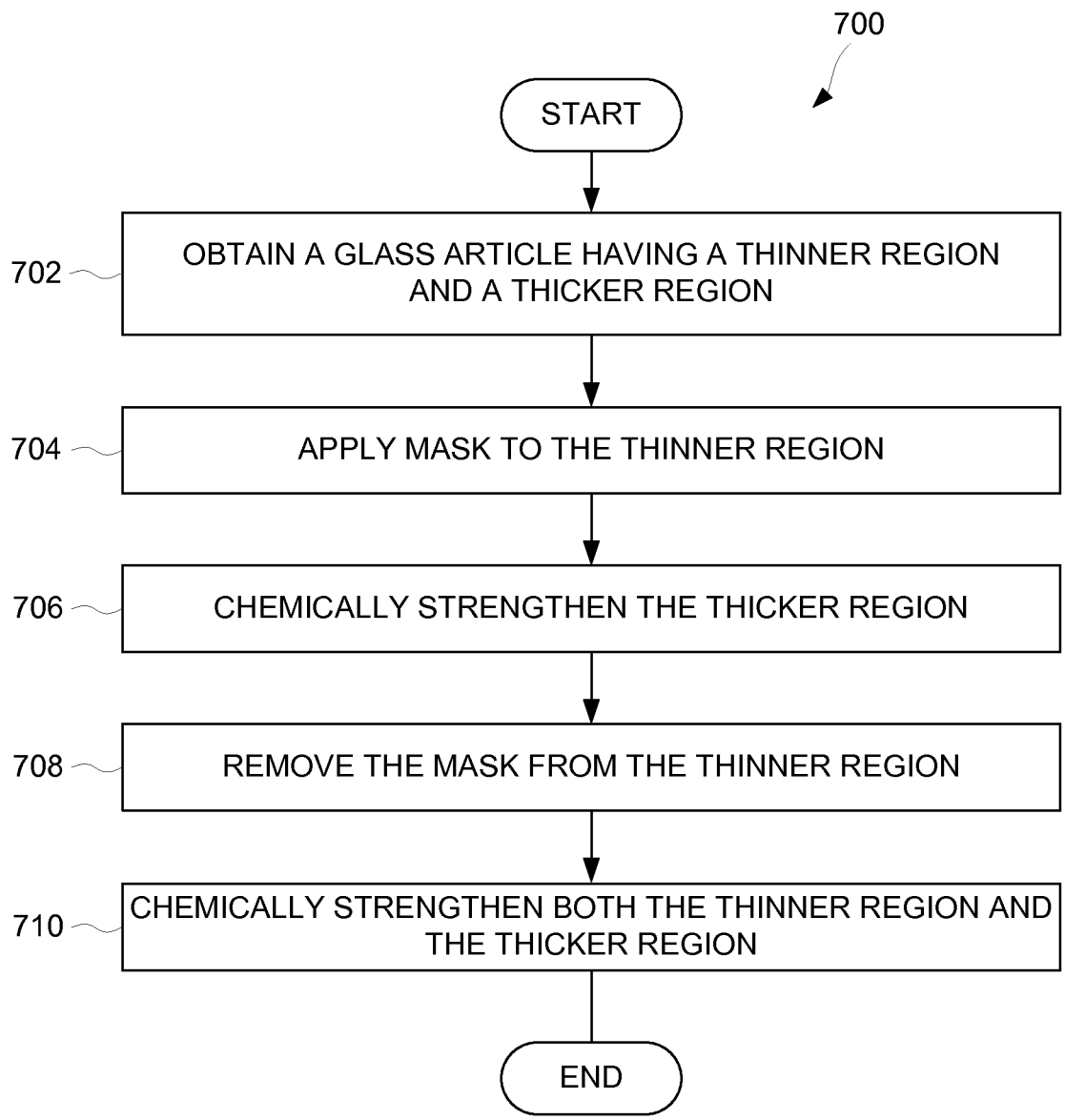
FIG. 7 is a flow diagram of a glass strengthening process according to another embodiment.

FIG. 7 is a flow diagram of a glass strengthening process 700 according to another embodiment. The glass strengthening process 700 can initially obtain 702 a glass article to be chemically strengthened.

The glass strengthening process 700 is particularly well-suited for strengthening a glass article that has regions of different thickness. For example, the glass strengthening process 700 can yield the glass article 400 shown in FIG. 4 which has different degree, amount or level of chemically strengthening applied to different regions.

In this embodiment, the glass article has at least a plurality of distinct regions, with one of the regions corresponding to a thinner region and another of the regions corresponding to a sticker region. Once the glass article has been obtained 702, a mask can be applied 704 to the thinner region. Next, the thicker region of the glass article can be chemically strengthened 706. At this point, the mask that has been applied 704 to the thinner region of the glass article serves to inhibit chemical strengthening of the thinner region. After the chemical strengthening 706 of the thicker region has concluded, the mask can be removed 708 from the thinner region. Thereafter, the glass article, including both the thinner region and the thicker region, can be chemically strengthened 710. Following the chemical strengthening 710, the glass strengthening process 700 can end.

Additionally, although not shown, additional post-processing can be performed with respect to the glass member. Still further, the glass article can eventually be used in a consumer electronic device, such as a handheld electronic device where the glass article can form, for example, a portion of said outer housing.

Although the mask applied 704 to the thinner region can be formed such that chemically strengthening is completely blocked by the mask material. Alternatively, the mask applied 704 to the thicker region can partially block chemical strengthening. The masking material can vary, including a metal layer (e.g., foil), polyimide, and the like. Photolithographic patterning or etching can be used to pattern the mask material. The metal layer can, for example, be aluminum.

Figure 8A:
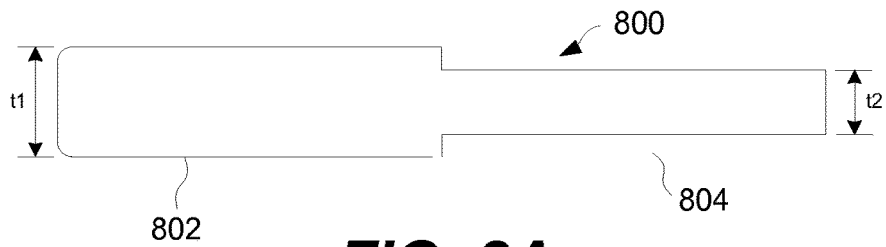
FIGS. 8A-8E illustrate processing to chemically strengthened a glass article.
Figure 8B:
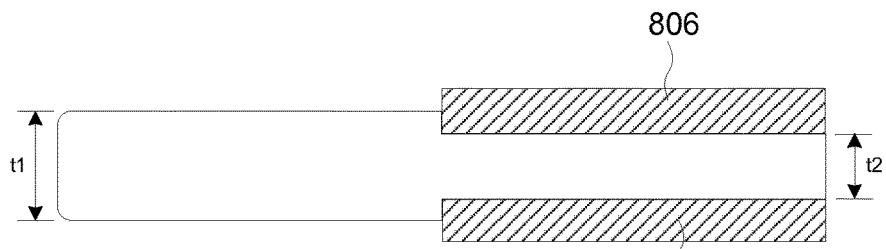
Figure 8C:
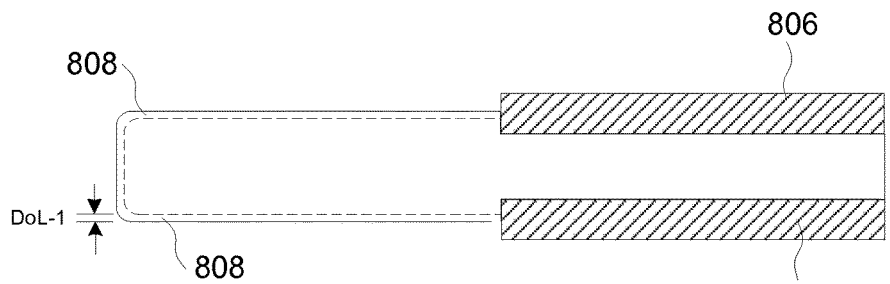
Figure 8D:
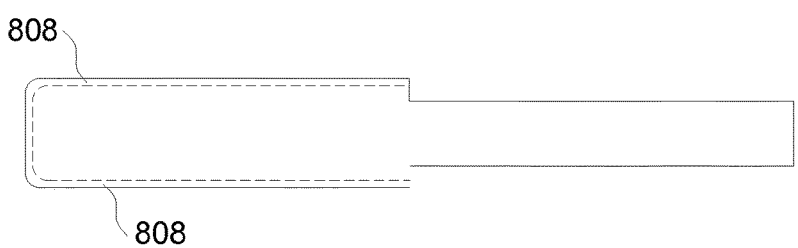

FIGS. 8A-8E illustrate processing to chemically strengthened a glass article 800. The processing can correspond to the glass strengthening process 700 illustrated in FIG. 7. In FIG. 8A, the glass article 800 is shown having a variable thickness. The glass article 800 has a thick region 802 with a thickness t1, and a thin region 804 having a thickness t2. In FIG. 8B, a mask 806 can then be applied over the thin region 804 of the glass article 800. Then, as illustrated in FIG. 8C, upon placing the glass article 800 with the applied mask 806 into a chemical strengthening bath, a peripheral region 808 of the thick region 802 can be chemically strengthened. The chemical strengthening at the peripheral region 808 has a controlled first depth of layer (DoL-1). Following the chemical strengthening that results in the peripheral region 808 of the thick region 802, the glass article 800 can be removed from the chemical strengthening bath and the mask 806 can be removed. FIG. 8C illustrates the glass article 800 after the chemical strengthening and removal of the mask 806.

Figure 8E:
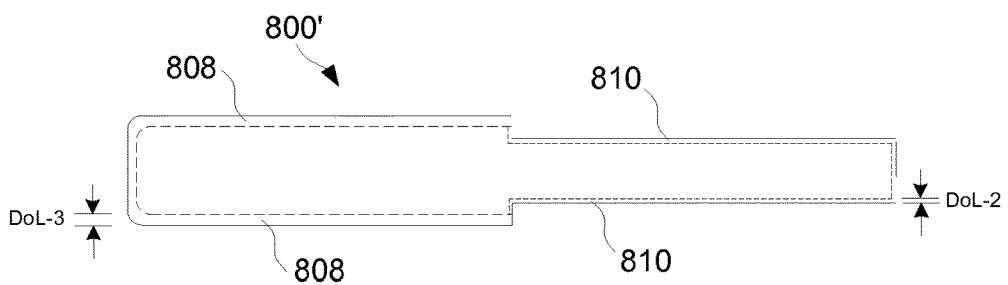

Then, as illustrated in FIG. 8E, upon placing the glass article 800 (with no mask applied) into a chemical strengthening bath (which can be the same as the above-described chemical strengthening bath or a new chemical strengthening bath) so that a peripheral region 808 of the thick region 802 as well as a peripheral region 810 of the thin region 804 can be chemically strengthened. The chemical strengthening of the peripheral region 810 following the subsequent chemical strengthening has a second depth of layer (DoL-2). Additionally, the chemical strengthening of the peripheral region 808 can provide further chemical strengthening to the peripheral region 808 of the thick region 802. The chemical strengthening of the peripheral region 808 following the subsequent chemical strengthening has a third depth of layer (DoL-3). In this example, the second depth of layer is less than the third depth of layer. Following the subsequent chemical strengthening that results in the peripheral region 810 of the thin region 804 as well as in the peripheral region 808 of the thick region 802, the glass article 800 can be removed from the chemical strengthening bath. Consequently, as shown in FIG. 8E, the resulting glass article 800' represents a strengthened version of the glass article 800 in which the thick region 802 is chemically strengthened to a greater extent than the thin region 804. Advantageously, the different regions of the glass article 800 are able to be chemically strengthened differently for better performance.

Following such chemical strengthening, depending on the type of glass, the glass article 800' having a 1 mm thickness can have a central tension (CT) of about 20-100 MPa (Mega Pascals) at a central portion, the peripheral portion 808 can have a peak compressive stress at its surface of about 300-1100 MPa, and the depth of the compressive layer (i.e., depth of layer) can be about 20-150 microns. As examples, the glass article 800' can be formed of aluminosilicate glass or lithium-aluminosilicate glass. In a more specific embodiment, the glass article 800' having a 1 mm thickness can have a central tension (CT) of about 50-60 MPa (Mega Pascals) at a central portion, the peripheral portion 808 can have a peak compressive stress at the surface of about 700-800 MPa, and the depth of the compressive layer (i.e., depth of layer) can be about 50-60 microns for the thick region 802 and about 30-40 microns for the thin region 804.

Figure 9A:
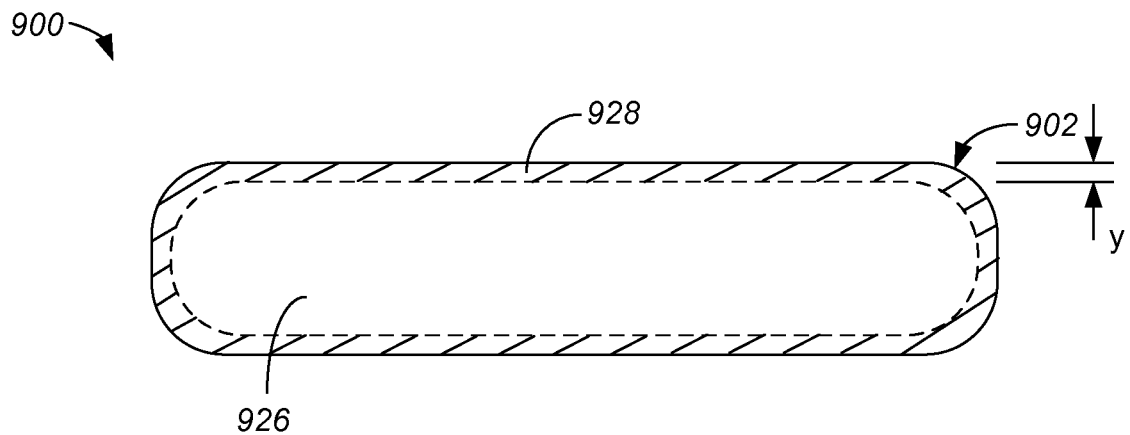
FIG. 9A is a cross-sectional diagram of a glass cover which has been chemically treated such that a chemically strengthened layer is created according to one embodiment.

A glass cover which has undergone a chemical strengthening process generally includes a chemically strengthened layer, as previously mentioned. FIG. 9A is a cross-sectional diagram of a glass cover which has been chemically treated such that a chemically strengthened layer is created according to one embodiment. A glass cover 900 includes a chemically strengthened layer 928 and a non-chemically strengthened portion 926. Although the glass cover 900 is, in one embodiment, subjected to chemical strengthening as a whole, the outer surfaces receive the strengthening. The effect of the strengthening is that the non-chemically strengthened portion 926 is in tension, while the chemically strengthened layer 928 is in compression. While glass cover 900 in FIG. 9A is shown as having a rounded edge geometry 902, it should be appreciated that glass cover 900 may generally have any edge geometry, though rounded geometries at edges may allow for increased strengthening of the edges of glass cover 900. Rounded edge geometry 902 is depicted by way of example, and not for purposes of limitation.

Figure 9B:
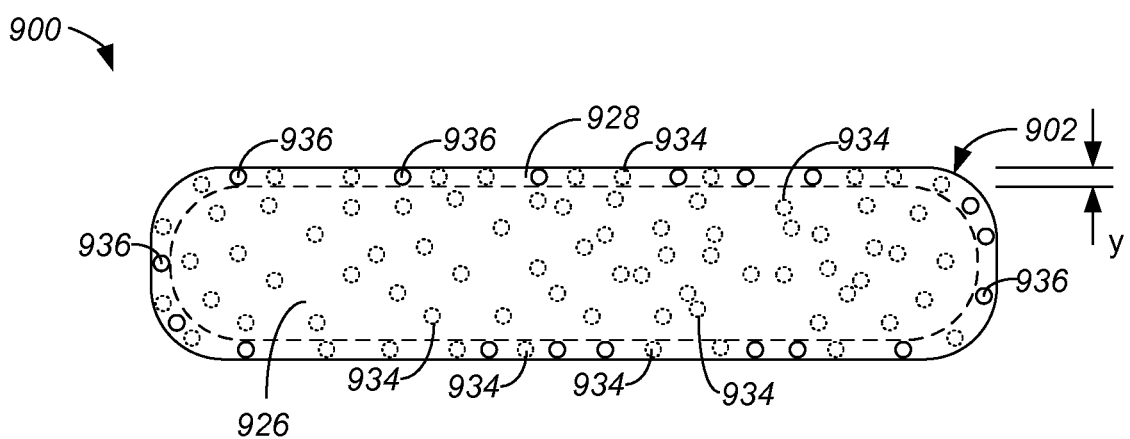
FIG. 9B is a cross-sectional diagram of a glass cover which has been chemically treated, as shown to include a chemically treated portion in which potassium ions have been implanted according to one embodiment.

FIG. 9B is a cross-sectional diagram of a glass cover which has been chemically treated, as shown to include a chemically treated portion in which potassium ions have been implanted according to one embodiment. Chemically strengthened layer 928 has a thickness (y) which may vary depending upon the requirements of a particular system in which glass cover 900 is to be utilized. Non-chemically strengthened portion 926 generally includes $Na^+$ ions 934 but no Alkali metal ions 936. A chemical strengthening process causes chemically strengthened layer 928 to be formed such that chemically strengthened layer 928 includes both $Na^+$ ions 934 and Alkali metal ions 936.

Figure 10:
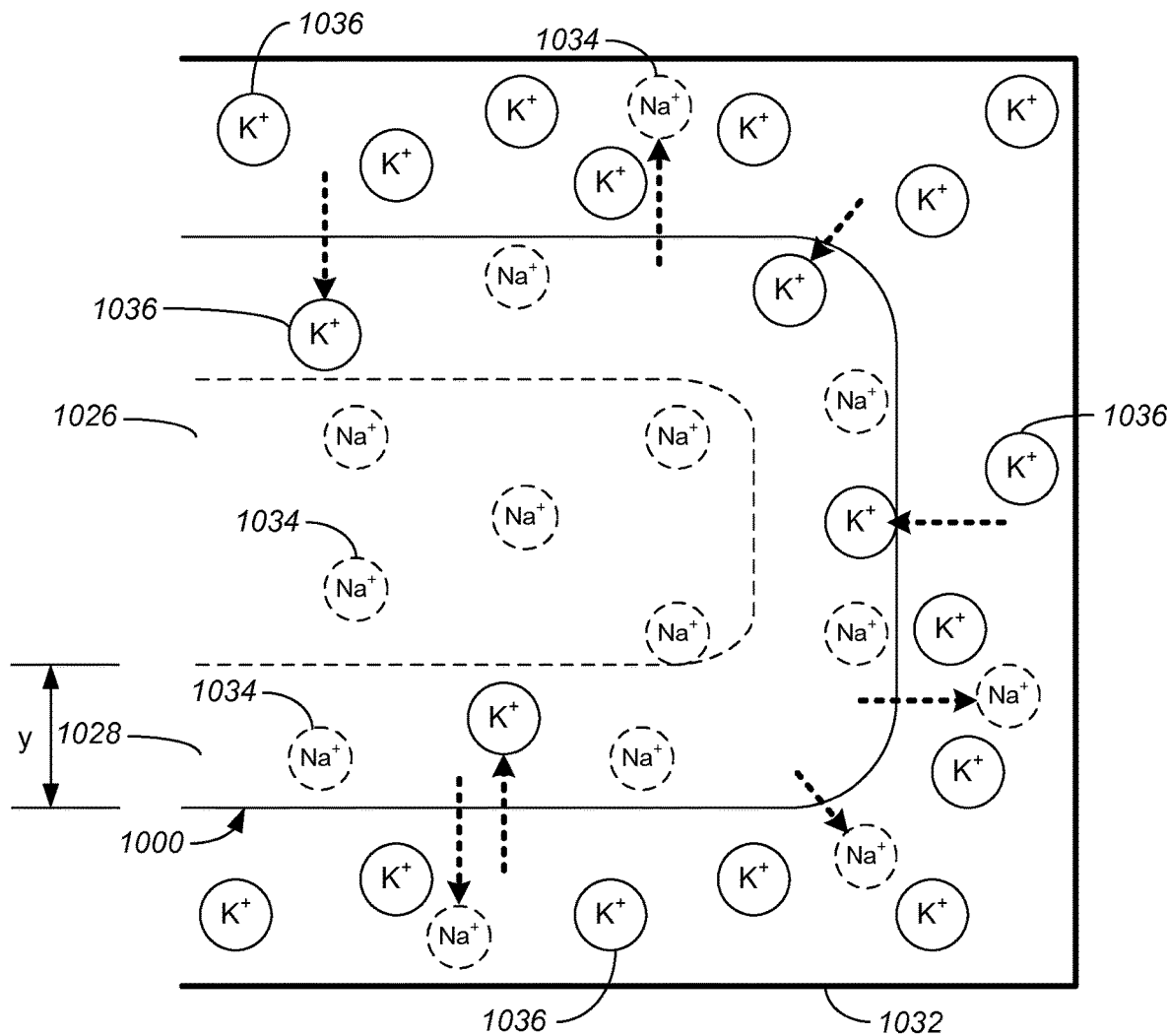
FIG. 10 is a diagrammatic representation of a chemical treatment process that involves submerging a glass cover in an ion bath according to one embodiment.

FIG. 10 is a diagrammatic representation of a chemical treatment process that involves submerging a glass cover in an ion bath according to one embodiment. When glass cover 1000, which is partially shown in cross-section, is submerged or soaked in a heated ion bath 1032, diffusion occurs. As shown, Alkali metal ions 1034 (e.g., Sodium (Na)) which are present in glass cover 1000 diffuse into ion bath 1032 while Alkali metal ions 1036 (e.g., potassium (K)) in ion bath 1032 diffuse into glass cover 1000, such that a chemically strengthened layer 1028 is formed. In other words, Alkali metal ions 1036 from ion bath 1032 can be exchanged with $Na^+$ ions 1034 to form chemically strengthened layer 1028. Alkali metal ions 1036 typically would not diffuse into a center portion 1026 of glass cover 1000. By controlling the duration (i.e., time) of a chemical strengthening treatment, temperature and/or the concentration of Alkali metal ions 1036 in ion bath 1032, the thickness (y) of chemically strengthened layer 1028 may be substantially controlled.

The concentration of Alkali metal ions in an ion bath may be varied while a glass cover is soaking in the ion bath. In other words, the concentration of Alkali metal ions in an ion bath may be maintained substantially constant, may be increased, and/or may be decreased while a glass cover is submerged in the ion bath without departing from the spirit or the scope of the present invention. For example, as Alkali metal ions displace $Na^+$ ions in the glass, the $Na^+$ ions become part of the ion bath. Hence, the concentration of Alkali metal ions in the ion bath may change unless additional Alkali metal ions are added into the ion bath.

As previously discussed, glass covers can be used as an outer surface of portions of a housing for electronic devices, such as portable electronic devices. Those portable electronic devices that are small and highly portable can be referred to as handheld electronic devices. A handheld electronic device may, for example, function as a media player, phone, internet browser, email unit or some combination of two or more of such. A handheld electronic device generally includes a housing and a display area.

FIGS. 11A and 11B are diagrammatic representations of electronic device 1100 according to one embodiment. FIG. 11A illustrates a top view for the electronic device 1100, and FIG. 11B illustrates a cross-sectional side view for electronic device 1100 with respect to reference line A-A'. Electronic device 1100 can include housing 1102 that has glass cover window 1104 (glass cover) as a top surface. Cover window 1104 is primarily transparent so that display assembly 1106 is visible through cover window 1104. Cover window 1104 can be chemically strengthened using the multi-bath chemical processing described herein. Display assembly 1106 can, for example, be positioned adjacent cover window 1104. Housing 1102 can also contain internal electrical components besides the display assembly, such as a controller (processor), memory, communications circuitry, etc. Display assembly 1106 can, for example, include a LCD module. By way of example, display assembly 1106 may include a Liquid Crystal Display (LCD) that includes a Liquid Crystal Module (LCM). In one embodiment, cover window 1104 can be integrally formed with the LCM. Housing 1102 can also include an opening 1108 for containing the internal electrical components to provide electronic device 1100 with electronic capabilities. In one embodiment, housing 1102 need not include a bezel for cover window 1104. Instead, cover window 1104 can extend across the top surface of housing 1102 such that the edges of cover window 1104 can be aligned (or substantially aligned) with the sides of housing 1102. The edges of cover window 1104 can remain exposed. Although the edges of cover window 1104 can be exposed as shown in FIGS. 11A and 11B, in alternative embodiment, the edges can be further protected. As one example, the edges of cover window 1104 can be recessed (horizontally or vertically) from the outer sides of housing 1102. As another example, the edges of cover window 1104 can be protected by additional material placed around or adjacent the edges of cover window 1104.

Cover window 1104 may generally be arranged or embodied in a variety of ways. By way of example, cover window 1104 may be configured as a protective glass piece that is positioned over an underlying display (e.g., display assembly 1106) such as a flat panel display (e.g., LCD) or touch screen display (e.g., LCD and a touch layer). Alternatively, cover window 1104 may effectively be integrated with a display, i.e., glass window may be formed as at least a portion of a display. Additionally, cover window 1104 may be substantially integrated with a touch sensing device such as a touch layer associated with a touch screen. In some cases, cover window 1104 can serve as the outer most layer of the display.

FIGS. 12A and 12B are diagrammatic representations of electronic device 1200 according to another embodiment. FIG. 12A illustrates a top view for electronic device 1200, and FIG. 12B illustrates a cross-sectional side view for electronic device 1200 with respect to reference line B-B'. Electronic device 1200 can include housing 1202 that has glass cover window 1204 (glass cover) as a top surface. In this embodiment, cover window 1204 can be protected by side surfaces 1203 of housing 1202. Here, cover window 1204 does not fully extend across the top surface of housing 1202; however, the top surface of side surfaces 1203 can be adjacent to and aligned vertically with the outer surface of cover window 1204. Since the edges of cover window 1204 can be rounded for enhanced strength, there may be gaps 1205 that are present between side surfaces 1203 and the peripheral edges of cover window 1204. Gaps 1205 are typically very small given that the thickness of cover window 1204 is thin (e.g., less than 3 mm). However, if desired, gaps 1205 can be filled by a material. The material can be plastic, rubber, metal, etc. The material can conform in gap 1205 to render the entire front surface of electronic device 1200 flush, even across gaps 1205 proximate the peripheral edges of cover window 1204. The material filling gaps 1205 can be compliant. The material placed in gaps 1205 can implement a gasket. By filling the gaps 1205, otherwise probably undesired gaps in the housing 1202 can be filled or sealed to prevent contamination (e.g., dirt, water) forming in the gaps 1205. Although side surfaces 1203 can be integral with housing 1202, side surface 1203 could alternatively be separate from housing 1202 and, for example, operate as a bezel for cover window 1204.

Cover window 1204 is primarily transparent so that display assembly 1206 is visible through cover window 1204. Display assembly 1206 can, for example, be positioned adjacent cover window 1204. Housing 1202 can also contain internal electrical components besides the display assembly, such as a controller (processor), memory, communications circuitry, etc. Display assembly 1206 can, for example, include a LCD module. By way of example, display assembly 1206 may include a Liquid Crystal Display (LCD) that includes a Liquid Crystal Module (LCM). In one embodiment, cover window 1204 is integrally formed with the LCM. Housing 1202 can also include an opening 1208 for containing the internal electrical components to provide electronic device 1200 with electronic capabilities.

The front surface of electronic device 1200 can also include user interface control 1208 (e.g., click wheel control). In this embodiment, cover window 1204 does not cover the entire front surface of electronic device 1200. Electronic device 1200 essentially includes a partial display area that covers a portion of the front surface.

Cover window 1204 may generally be arranged or embodied in a variety of ways. By way of example, cover window 1204 may be configured as a protective glass piece that is positioned over an underlying display (e.g., display assembly 1206) such as a flat panel display (e.g., LCD) or touch screen display (e.g., LCD and a touch layer). Alternatively, cover window 1204 may effectively be integrated with a display, i.e., glass window may be formed as at least a portion of a display. Additionally, cover window 1204 may be substantially integrated with a touch sensing device such as a touch layer associated with a touch screen. In some cases, cover window 1204 can serve as the outer most layer of the display.

As noted above, the electronic device can be a handheld electronic device or a portable electronic device. The invention can serve to enable a glass cover to be not only thin but also adequately strong. Since handheld electronic devices and portable electronic devices are mobile, they are potentially subjected to various different impact events and stresses that stationary devices are not subjected to. As such, the invention is well suited for implementation of glass surfaces for handheld electronic device or a portable electronic device that are designed to be thin.

The strengthened glass, e.g., glass covers or cover windows, is particularly useful for thin glass applications. For example, the thickness of a glass cover being strengthened can be between about 0.5-2.5 mm. In other embodiments, the strengthening is suitable for glass products whose thickness is less than about 2 mm, or even thinner than about 1 mm, or still even thinner than about 0.6 mm.

Chemically strengthening glass, e.g., glass covers or cover windows, can be more effective for edges of glass that are rounded by a predetermined edge geometry having a predetermined curvature (or edge radius) of at least 10% of the thickness applied to the corners of the edges of the glass. In other embodiments, the predetermined curvature can be between 20% to 50% of the thickness of the glass. A predetermined curvature of 50% can also be considered a continuous curvature, one example of which is illustrated in FIG. 3E.

In one embodiment, the size of the glass cover depends on the size of the associated electronic device. For example, with handheld electronic devices, the size of the glass cover is often not more than five (5) inches (about 12.7 cm) diagonal. As another example, for portable electronic devices, such as smaller portable computers or tablet computers, the size of the glass cover is often between four (4) (about 10.2 cm) to twelve (12) inches (about 30.5 cm) diagonal. As still another example, for portable electronic devices, such as full size portable computers, displays (including televisions) or monitors, the size of the glass cover is often between ten (10) (about 25.4 cm) to twenty (20) inches (about 50.8 cm) diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size.

For example, the minimum thickness of the glass cover can correspond to about 0.3 mm for small handheld electronic devices, about 0.5 mm for smaller portable computers or tablet computers, about 1.0 mm or more for full size portable computers, displays or monitors, again depending on the size of the screen. However, more generally, the thickness of the glass cover can depend on the application and/or the size of electronic device.

As discussed above, glass cover or, more generally, a glass piece may be chemically treated such that surfaces of the glass are effectively strengthened. Through such strengthening, glass pieces can be made stronger so that thinner glass pieces can be used with consumer electronic device. Thinner glass with sufficient strength allows for consumer electronic device to become thinner.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

The various aspects, features, embodiments or implementations of the invention described above can be used alone or in various combinations.

Additional details on strengthening edges of glass articles and/or different chemical baths can be found in: (i) U.S. Provisional Patent Application No. 61/156,803, filed Mar. 2, 2009 and entitled "TECHNIQUES FOR STRENGTHENING GLASS COVERS FOR PORTABLE ELECTRONIC DEVICES", which is herein incorporated by reference; (ii) International Patent Application No. PCT/US2010/025979, filed Mar. 2, 2010 and entitled "Techniques for Strengthening Glass Covers for Portable Electronic Devices", which is herein incorporated by reference; (iii) U.S. Provisional Patent Application No. 61/374,988, filed Aug. 18, 2010, and entitled "ENHANCED STRENGTHING OF GLASS", which is hereby incorporated herein by reference; (iv) U.S. patent application Ser. No. 12/895,823, filed Sep. 30, 2010 and entitled "ENHANCED STRENGTHENING OF GLASS"; (v) U.S. patent application Ser. No. 12/895,372, filed Sep. 30, 2010 and entitled "TECHNIQUES FOR STRENGTHENING GLASS COVERS FOR PORTABLE ELECTRONIC DEVICES", which is herein incorporated by reference; (vi) U.S. patent application Ser. No. 12/895,393, filed Sep. 30, 2010 and entitled "TECHNIQUES FOR STRENGTHENING GLASS COVERS FOR PORTABLE ELECTRONIC DEVICES", which is herein incorporated by reference; (vii) U.S. Provisional Patent Application No. 61/301,585, filed Feb. 4, 2010 and entitled "TECHNIQUES FOR STRENGTHENING GLASS COVERS FOR PORTABLE ELECTRONIC DEVICES," which is hereby incorporated herein by reference; (viii) U.S. Provisional Patent Application No. 61/410,290, filed Nov. 4, 2010, and entitled "ENHANCED STRENGTHING OF GLASS", which is hereby incorporated herein by reference; (ix) PCT International Application No. PCT/US2011/023499, filed Feb. 2, 2011, and entitled "ENHANCED CHEMICAL STRENGTHENING GLASS OF COVERS FOR PORTABLE ELECTRONIC DEVICES", which is hereby incorporated by reference; (x) U.S. patent application Ser. No. 12/847,926, filed Jul. 30, 2010, and entitled "ELECTRONIC DEVICE HAVING SELECTIVELY STRENGTHENING GLASS COVER GLASS", which is hereby incorporated herein by reference; (xi) U.S. Provisional Patent Application No. 61/453,404, filed Mar. 16, 2011, and entitled "ELECTRONIC DEVICE HAVING SELECTIVELY STRENGTHENED GLASS", which is hereby incorporated herein by reference; (xii) U.S. patent application Ser. No. 13/235,090, filed concurrently, and entitled "ELECTRONIC DEVICE HAVING SELECTIVELY STRENGTHENED GLASS", which is hereby incorporated herein by reference.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for chemically strengthening a piece of glass for use as a cover for an electronic device, the method comprising:
   providing a piece of glass, the piece of glass having:
      a first portion defining a middle region of a substantially planar top surface of the piece of glass and having a first thickness that is between 0.2 mm and 0.4 mm thick; and
      a second portion defining a side region along a periphery of the substantially planar top surface of the piece of glass and having a second thickness that is between 0.6 mm and 1.0 mm thick;
   applying a mask to the first portion of the piece of glass;
   chemically strengthening the second portion of the piece of glass by placing the piece of glass in a first bath;
   subsequently removing the mask from the first portion of the piece of glass;
   chemically strengthening the first portion and the second portion of the piece of glass by placing the piece of glass in a second bath, such that:

the chemically strengthened first portion has a first depth of layer of between 30 microns and 40 microns; and the chemically strengthened second portion has a second depth of layer of between 50 microns and 60 microns; and positioning the piece of glass over a display of an electronic device.

2. A method as recited in claim 1, wherein the chemically strengthening of the first portion to the first depth of layer of between 30 microns and 40 microns provides a first predetermined characteristic to the first portion.

3. A method as recited in claim 2, wherein the chemically strengthening of the second portion to the second depth of layer of between 50 microns and 60 microns provides a second predetermined characteristic to the second portion.

4. A method as recited in claim 3, wherein:
the first predetermined characteristic pertains to a first central tension limit; and
the second predetermined characteristic pertains to a second-central tension limit.

5. A method as recited in claim 1, wherein the piece of glass has a thickness of not more than about 0.6 mm.

6. A method as recited in claim 1, wherein the first thickness is between about 20-70% of the second thickness.

7. A method for strengthening a piece of glass, the piece of glass comprising:
a first portion defining a middle region of a substantially planar first surface and having a first thickness that is between 0.2 mm and 0.4 mm thick, and
a second portion defining a side region of the substantially planar first surface and having a second thickness that is between 0.6 mm and 1.0 mm thick, the side region extending around a periphery of the middle region, the method comprising:
applying a first mask to the second portion of the piece of glass;
chemically strengthening the first portion to a first depth of layer of between 30 microns and 40 microns;
subsequently removing the first mask from the second portion;
applying a second mask to the first portion;
chemically strengthening the second portion to a second depth of layer of between 50 microns and 60 microns;
subsequently removing the second mask from the first portion; and
attaching the piece of glass to a portable electronic device to define an outer surface of the portable electronic device.

8. A method as recited in claim 7, wherein the first thickness of the piece of glass is not more than about 0.6 mm.

9. A method as recited in claim 8, wherein the chemically strengthening of the first portion comprises placing the piece of glass in a first potassium solution.

10. A method as recited in claim 9, wherein the chemically strengthening of the second portion comprises placing the piece of glass in the first potassium solution or a second potassium solution.

11. A method as recited in claim 7, wherein the first thickness is 20-70% of the second thickness.

12. A method for strengthening a piece of glass for a housing for a portable electronic device defining a substantially planar surface and having a thinner region and a thicker region, the method comprising:
applying a first mask to the thinner region of the piece of glass;
chemically strengthening the thicker region;
subsequently removing the first mask from the thinner region; and
chemically strengthening both the thinner region and the thicker region, such that;
the chemically strengthened thinner region has a first depth of layer of between 30 microns and 40 microns; and
the chemically strengthened thicker region has a second depth of layer of between 50 microns and 60 microns,
wherein the thinner region corresponds to a middle region of the substantially planar surface having a first thickness that is between 0.2 and 0.4 mm thick, and the thicker region corresponds to a side region of the substantially planar surface surrounding the thinner region and having a second thickness that is between 0.6 to 1.0 mm thick; and
attaching the piece of glass to the portable electronic device.

13. A method as recited in claim 12, wherein the second thickness of the thicker region is not more than about 0.6 mm.

14. A method as recited in claim 12, wherein:
the chemically strengthening of the thicker region comprises placing the piece of glass in a first potassium solution, and
the chemically strengthening of the thinner region comprises placing the piece of glass in the first potassium solution or a second potassium solution.

15. A method for processing a glass piece for use as a cover for an electronic device, the method comprising:
masking a first portion of the glass piece to block ion exchange;
submerging the glass piece in a heated ion bath to facilitate ion exchange with at least a second portion of the glass piece other than the first portion which is masked;
removing the glass piece from the heated ion bath after a first predetermined duration;
unmasking the first portion of the glass piece after removing the glass piece from the heated ion bath;
subsequently submerging the glass piece in the heated ion bath or another heated ion bath to facilitate ion exchange with at least the first portion of the glass piece; and
removing the glass piece from the heated ion bath or the another heated ion bath after a second predetermined duration; and
positioning the glass piece over a display of an electronic device,
wherein the glass piece defines a substantially planar surface having a middle region and an outer peripheral region, the first portion defines at least part of the middle region of the substantially planar surface and has a first thickness that is between 0.2 and 0.4 mm thick, the first portion has a first depth of layer of between 30 microns and 40 microns, the second portion defines at least part of the outer peripheral region of the substantially planar surface and has a second thickness that is between 0.6 to 1.0 mm thick, and the second portion has a second depth of layer of between 50 microns and 60 microns.

16. A method as recited in claim 15, wherein the method further comprises:
   performing post-processing on the glass piece following removal of the glass piece from the heated ion bath or the another heated ion bath.

17. A method as recited in claim 15, wherein
   positioning the glass piece comprises attaching the glass piece to a portable electronic device, the glass piece serving as a portion of an outer surface of a housing of the portable electronic device.

18. A method as recited in claim 15, wherein the glass piece has a thickness of not more than about 0.6 mm.

19. A consumer electronic product, comprising:
   a housing having a front surface, a back surface and side surfaces;
   electrical components provided at least partially internal to the housing, the electrical components including at least a controller, a memory, and a display, the display being provided at or adjacent the front surface of the housing; and
   a cover glass provided at or over the front surface of the housing such that it is provided over the display, the cover glass comprising:
      a middle region defining a first substantially planar surface and having a first thickness between 0.2 and 0.4 mm and a first level of chemical strengthening that has a first depth of layer of between 30 microns and 40 microns; and
      a side region along a periphery of the cover glass, defining a second substantially planar surface that is substantially coplanar with the first substantially planar surface and having a second thickness between 0.6 to 1.0 mm and a second level of chemical strengthening that has a second depth of layer of between 50 microns and 60 microns.

20. A consumer electronic product as recited in claim 19, wherein the middle region is chemically strengthened to a lesser depth than the side region.

* * * * *